US012105668B2

(12) United States Patent
Hancy

(10) Patent No.: US 12,105,668 B2
(45) Date of Patent: *Oct. 1, 2024

(54) SYSTEM AND METHOD FOR ACCESSING SERVER INFORMATION

(71) Applicant: FUNDI SOFTWARE PTY LTD, Bentley (AU)

(72) Inventor: John Hancy, Bentley (AU)

(73) Assignee: Fundi Software Pty Ltd, Bentley (AU)

( * ) Notice: Subject to any disclaimer, the term of this patent is extended or adjusted under 35 U.S.C. 154(b) by 1508 days.

This patent is subject to a terminal disclaimer.

(21) Appl. No.: 16/313,404

(22) PCT Filed: Jul. 3, 2017

(86) PCT No.: PCT/AU2017/050688
§ 371 (c)(1),
(2) Date: Dec. 26, 2018

(87) PCT Pub. No.: WO2018/000052
PCT Pub. Date: Jan. 4, 2018

(65) Prior Publication Data
US 2019/0163670 A1 May 30, 2019

(30) Foreign Application Priority Data
Jul. 1, 2016 (AU) .................. 2016902605

(51) Int. Cl.
*G06F 11/00* (2006.01)
*G06F 3/06* (2006.01)
(Continued)

(52) U.S. Cl.
CPC .......... *G06F 16/122* (2019.01); *G06F 3/0604* (2013.01); *G06F 3/0655* (2013.01);
(Continued)

(58) Field of Classification Search
CPC .............. G06F 11/301; G06F 11/3476; G06F 11/3636; G06F 11/3051; G06F 11/3466
See application file for complete search history.

(56) References Cited

U.S. PATENT DOCUMENTS 10,216,612 B1 * 2/2019 Hancy ................. G06F 11/3051
2005/0193277 A1 * 9/2005 Horikawa ........... G06F 11/3495
714/45

(Continued)

OTHER PUBLICATIONS

International Search Report and Written Opinion dated Sep. 27, 2017 from International Application No. PCT/AU2017/050688 (Authorised officer, Khalid Ahmad), 15 pages.

(Continued)

*Primary Examiner* — Charles Ehne
(74) *Attorney, Agent, or Firm* — Danielson Legal LLC

(57) ABSTRACT

The invention relates to system and methods for accessing transaction servers to obtain particular information related to the transaction processing. In particular, the system 10 is adapted to interact with the internal trace 14 of the CICS 12 for reading the trace entries generated by CICS 12 during transaction processing and written to the internal trace 14. The system 10 is adapted to interact with the internal trace 14 in such a manner that the performance of the transaction processing being conducted in the CICS is not negatively impacted. In accordance with an arrangement of the invention, there is provided a method (to be described at a later stage) for reading and interpreting the content of the internal trace in a period of time that is less than the period of time needed for an internal trace to become full and wrap losing the trace entries stored therein.

47 Claims, 10 Drawing Sheets

(51) Int. Cl.
*G06F 9/455* (2018.01)
*G06F 9/50* (2006.01)
*G06F 11/07* (2006.01)
*G06F 11/30* (2006.01)
*G06F 11/32* (2006.01)
*G06F 11/34* (2006.01)
*G06F 11/36* (2006.01)
*G06F 12/16* (2006.01)
*G06F 16/11* (2019.01)
*G06F 16/903* (2019.01)
*H04L 67/01* (2022.01)

(52) U.S. Cl.
CPC ........ *G06F 3/0673* (2013.01); *G06F 9/45558* (2013.01); *G06F 9/5077* (2013.01); *G06F 11/0709* (2013.01); *G06F 11/301* (2013.01); *G06F 11/3051* (2013.01); *G06F 11/323* (2013.01); *G06F 11/34* (2013.01); *G06F 11/3476* (2013.01); *G06F 11/3495* (2013.01); *G06F 11/3636* (2013.01); *G06F 12/16* (2013.01); *G06F 16/90335* (2019.01); *G06F 2009/45583* (2013.01); *H04L 67/01* (2022.05)

(56) References Cited

U.S. PATENT DOCUMENTS

| | | |
|---|---|---|
| 2007/0220361 A1 | 9/2007 | Barnum et al. |
| 2008/0155345 A1 | 6/2008 | Edgar et al. |
| 2011/0072310 A1 | 3/2011 | Lee et al. |
| 2011/0153817 A1 | 6/2011 | Wright et al. |
| 2012/0246518 A1* | 9/2012 | Francis ............... G06F 11/3476 |
| | | 714/45 |
| 2013/0185021 A1 | 7/2013 | Addison et al. |
| 2015/0120996 A1 | 4/2015 | Pokam et al. |
| 2015/0178180 A1* | 6/2015 | Burghard ............ G06F 11/0709 |
| | | 714/45 |
| 2016/0070634 A1 | 3/2016 | Shirlen et al. |
| 2017/0083395 A1* | 3/2017 | Beard ................. G06F 11/3476 |
| 2017/0315853 A1 | 11/2017 | Addison et al. |

OTHER PUBLICATIONS

International Preliminary Report on Patentability dated Sep. 11, 2018 from International Application No. PCT/AU2017/050688 (Authorised officer, Khalid Ahmad), 36 pages.

Non-Final Office Action dated Mar. 8, 2018 from U.S. Appl. No. 15/223,711, 18 pages.

* cited by examiner

|    | Point ID | Description | Event |
|----|----------|-------------|-------|
| 1  | XM 1102  | Attach | Transaction start |
| 2  | XS 070A  | Security User ID | User identification |
| 3  | RM 0209  | Create UOW ID | MRO token |
| 4  | RM FA01  | Create UOW ID | MRO token |
| 5  | AP 0500  | Initial LINK | First dispatch |
| 6  | PG 1101  | Initial LINK | First dispatch |
| 7  | PG 1101  | Program LINK | Link to another program |
| 8  | LD 0002  | Acquire Program | Program load |
| 9  | AP 00E1  | EXEC CICS entry | EXEC CICS EI level 1_1 |
| 10 | AP E160  | EXEC CICS entry | EXEC CICS EI level 1_2 |
| 11 | AP E161  | EXEC CICS exit | |
| 12 | AP 00E1  | EXEC CICS exit | |
| 13 | AP 3250  | DB2 SOL entry | DB2 SQL call |
| 14 | AP 3251  | DB2 SOL exit | |
| 15 | AP 3181  | DB2 SOL code | |
| 16 | AP A090  | MQ entry | MQ call |
| 17 | AP A091  | MQ exit | |
| 18 | AP 0328  | IMG DLI entry | IMS DLI call |
| 19 | AP 0311  | IMG Recovery Token | |
| 20 | AP 0329  | IMG DLI exit | |
| 21 | AP 21E0  | ICICS | Java EXEC CICS |
| 22 | RM FA11  | Commit UOW entry | Syncpoint commit |
| 23 | RM FA12  | Commit UOW end | |
| 24 | AP 0741  | ABEND | Transacction failure |
| 25 | RM 0201  | Backout UOW entry | Syncpoint backout |
| 26 | RM 0202  | Backout UOW end | |
| 27 | AP 0590  | Relese | Tansaction end |

Fig. 3c

SYSTEM AND METHOD FOR ACCESSING SERVER INFORMATION

CROSS-REFERENCE TO RELATED APPLICATIONS

This application is a U.S. National Stage application of PCT/AU2017/050688 filed 3 Jul. 2017, which claims priority to Australian Application No. 2016902605 filed 1 Jul. 2016, the entire disclosures of which are hereby incorporated by reference in their entireties.

TECHNICAL FIELD

The present invention relates to information technology, in particular to High performance IBM® mainframe computers used for online transaction processing (OLTP) and database management systems (DBMS) workloads.

The invention has been devised particularly, although not necessarily solely, in relation to system and methods for accessing transaction servers to obtain particular information related to the transaction processing.

BACKGROUND ART

The following discussion of the background art is intended to facilitate an understanding of the present invention only. The discussion is not an acknowledgement or admission that any of the material referred to is or was part of the common general knowledge as at the priority date of the application.

Transaction servers are computer systems that manage operations of transaction processing. Transaction processing divides work into individual and separate operations known as transactions. An example of a transaction server is the IBM® Customer Information Control System (CICS).

Transaction servers such as CICS are critical for the global economy because they process a relatively large number of transactions per day. Thus, it is important to guarantee smooth operation of the transaction servers. To guarantee smooth operation of the transaction server it is essential to monitor the transaction processing. Monitoring the transaction processing include (1) measuring the overall transaction performance and (2) gaining an understanding of what a particular application was doing while being processed in order to verify the accuracy and timeliness of programs and the corresponding application calls.

The monitoring process will permit during the lifecycle of an application to measure performance, diagnose problems and validate any changes made to the application. This is particular advantageous because it allows application developers to (1) measure the overall performance of the transactions during development thereof; (2) visualize the application events in detail e.g. EXEC CICS, DB2, IMS, MQ and Java calls, as well as program calls and returns; and (3) identify delays in transaction processing during testing prior to implementation into production.

Monitoring of the transaction processing is undertaken by, for example, visualising how transactions are executed in the transaction server (such as CICS).

CICS keeps a record of the processing of a computer program or the transaction. This record is called the CICS internal trace. The information collected from the internal trace can be used to assess problems and performance of the transaction processing.

The CICS internal trace is a virtual storage memory table that keeps a record of trace entries generated when either (1) CICS or an application program performs a function generating an application and/or system event or (2) CICS detects an exception condition.

In particular, the CICS internal trace is a series of linked buffers, each 4096 bytes (4K) in length, The buffers (also referred to as "internal trace buffer") are adapted to receive the trace entries. The trace entries provide information about the particular application and/or system event or exception condition.

During operation, the CICS appends trace entries to the "active" internal trace buffer until it becomes full.

A disadvantage of the CICS internal trace is that when the table becomes full, the table wraps causing trace entries recorded in the past to be lost. Deletion of the trace entries occurs at regular intervals—in production, the intervals may be only a few seconds. Thus, due to the internal trace table being located in memory and being transient in nature, the internal trace is typically inaccessible except in the event of a system or transaction abnormal termination when a dump is created.

Methods for overcoming the inability to directly access the information contained in the CICS internal trace table have been developed. These methods include (1) the formation of the CICS auxiliary trace, and (2) the installation of agents, hooks and exits to establish monitoring points (in lieu of the internal trace).

(1) The CICS auxiliary trace comprises a record of trace entries (also referred to herein as trace data). This record is stored in a data set called the auxiliary trace data set. The auxiliary trace data set is a sequentially organized data set on disk. While the auxiliary trace function is active, the trace entries generated during the transaction processing are stored in the auxiliary trace data set. There may be defined more than one auxiliary trace data set; this permits switching to other data sets when the data set that is currently being used is full. The data set is then post-processed in batch to format the trace entries for viewing by a user to and determine, for example, the reasons for an abnormal termination.

To collect large amounts of trace data it is necessary to initially define large enough auxiliary trace data sets; for example, if trace data is to be collected for a relative long period of time then relatively large auxiliary trace data sets will need to be defined.

The process for generating the auxiliary trace data set includes the step of activating the auxiliary trace option by the operator. Once a buffer containing internal trace data becomes full, the internal trace buffer is written to the auxiliary trace data set.

The disadvantage of using the auxiliary trace is that the writing internal trace buffers to the auxiliary trace data set has an adverse effect on the performance of the transaction processing due to adding to the overhead of the transaction processing conducted by the CICS.

(2) The second method for overcoming the inability to access the CICS internal trace table comprises of the use of monitors (such as agents, hooks, and exits) that record the application events of transactions as the transactions are being processed by the CICS. The recorded application events of transactions may then be viewed from the monitor user interface. An example of such a monitor is the IBM® Tivoli OMEGAMON XE for CICS on z/OS.

The disadvantage of these monitors is that they use agents, hooks and exits inside of the CICS environment to intercept application events. The agents, hooks and exits are included to collect the level of detail required to diagnose application problems. By including the agents, hooks and exits, the length of the code path for application calls made during transaction processing may be substantially increased; thus, transaction CPU and response times are increased. This additional code is run by the CICS during the transaction processing; in particular CICS executes the agents, hooks and exits on behalf of the monitor; thus adding to the overhead of the transaction processing conducted by CICS.

Further, the inclusion of the agents, hooks and exits into the CICS environment requires CICS administration and changes to CICS to alter CICS operations.

Furthermore, CICS applications can run across multiple CICS regions; this is referred to as Multi-region operation (MRO). MRO provides transaction routing, function shipping and distributed program link (DPL) services that allow distinct parts of a single transaction to be processed in multiple CICS regions. Conventional monitors typically treat each CICS region separately, thus requiring each piece of a MRO transaction to be analysed separately.

In summary, the conventional methods for overcoming the deficiencies of the CICS internal trace will be using resources of CICS thus adding to the overhead of the transaction processing conducted by the CICS. Moreover, as mentioned before, the internal trace is typically accessible only in the event of an abnormal termination and the resultant dump.

It is against this background that the present invention has been developed.

SUMMARY OF INVENTION

According to a first aspect of the invention there is provided a system for gaining information about particular application and/or system events, and exception conditions generated during processing of a computer program or a transaction and stored in a CICS internal trace in the form of trace entries, the system comprising first processing means for reading the CICS internal trace, and memory means for storing the trace entries.

Preferably, memory means comprises at least one auxiliary trace data set.

Preferably, the first processing means is adapted to adjust to the speed at which the trace entries are being written onto the internal trace.

Preferably, the first processing means is adapted to read the internal trace in a period of time that is less than the period of time needed for an internal trace to become full and wrap losing the trace entries stored therein.

Preferably, the first processing means is adapted to read the internal trace at substantially the same time that the trace entries are being written into the internal trace.

According to a second aspect of the invention there is provided a system for reconstructing an application lifecycle view of transactions processed by a transaction server having first memory means for storing trace entries that are generated during transaction processing, the system comprising a first processing means adapted to read the first memory means for collection of the trace entries, a second processing means adapted to reconstruct the transactions using the collected trace entries, and a third processing means adapted to store the reconstructed transactions for visualization by a user, wherein the first processing means and the second processing means are coupled to transfer the trace entries from the first processing means to the second processing means, and the second processing means and the third processing means are coupled to transfer the reconstructed transactions to the third processing means for storage of the reconstructed transactions to permit visualization by the user through a user interface.

Preferably, the trace entries are generated when either (1) CICS or an application program performs a function generating an application or system event or (2) CICS detects an exception condition.

Preferably, the transaction server comprises a CICS Transaction Server.

Preferably, the system further comprises second memory means coupled to the third processing means for storing of the reconstructed transactions.

Preferably, the second memory means comprises direct-access storage devices.

Preferably, the data model of the second memory means is based on a three tiered approach (summary, detail and checkpoint) to allow an end-user interface to locate and extract information of the reconstructed transactions in relative short period of time.

Preferably, the trace data is collected into a summary archive and a detail archive.

Preferably, the summary archive contains one record per transaction and is designed for a quick search of transactions by:
  a. Time; identifying when the transaction was processed
  b. Identification; identifying the CICS region where the transaction was processed, the transaction ID and programs used, the security user ID
  c. Performance; indicating transaction response time being broken down into its components including EXEC CICS, DB2, MQ and IMS, and abnormal ending (ABEND).

Preferably, the detail archive contains the trace entries for every transaction included in the summary archives.

Preferably, the system further comprises a fourth processing means for reading the CICS internal trace and writing the trace entries on a memory means.

Preferably, memory means comprises at least one auxiliary trace data set.

According to a third aspect of the invention there is provided a method for reconstructing an application lifecycle view of transactions processed by a transaction server having first memory means for storing trace entries generated during transaction processing the method comprises the steps of:
  a. Reading via a first processing means trace entries generated by the transaction server during processing of the transaction and written to an internal trace of the transaction server;
  b. Passing the trace entries to a second processing means;
  c. Reconstructing via a second processing means the application lifecycle of the transaction processed by the server using the trace entries read by the first processing means;
  d. Passing the reconstructed application lifecycle to a third processing means; and
  e. Writing via the third processing means the reconstructed application lifecycle to second memory means.

Preferably, the trace entries are generated when either (1) CICS or an application program performs a function generating an application or system event or (2) CICS detects an exception condition.

Preferably, the steps of reading the trace entries comprises the steps of
  1. Locating CICS regions on the logical partition (LPAR);
  2. Establishing a recovery (ESTAE) environment to detect and recover from abnormal endings (ABENDs) that occur if a CICS region suddenly becomes unavailable;

3. Establishing AR-mode cross-memory access to the CICS address space to access the control blocks of CICS and the internal trace that resides inside the CICS address space;
4. Verifying that the CICS address space is an active and eligible CICS region;
5. Locating the current internal trace buffer;
6. Iteratively repeating steps 3 to 5 until all CICS region have been read;
7. Reading the traces entries of the internal trace for each of the CICS regions.

Preferably, the reading of the trace entries occurs as close to the time that the trace entries are being written into the internal trace by the transaction server; to minimise the chance of data loss due to the wrap-around nature of the internal trace.

Preferably, locating the LPAR is done by following the address space control block (ASID/ASCB) chain using the standard technique for locating multiple virtual storage (MVS) address spaces;

Preferably, the step of reconstructing the application lifecycle of the transaction comprises the steps of:
1. Sequentially extracting the TREN trace entries from the 4K CICS internal trace buffer;
2. Deciding whether the analyser is to either (1) consolidate multi-region operations into a single transaction or (2) treat each CICS region separately;
2. Merging the trace entries from each CICS region in ascending chronological sequence;
3. Deciding whether a particular trace entry belongs (1) to the transaction that is currently being reconstructed or (2) to a new transaction;
4. If the particular trace entry belongs to a transaction that is currently being reconstructed then the trace entry is added to the transaction that is currently being reconstructed; else
5. If the particular trace entry belongs to a new transaction a new transaction is registered.

Preferably, the step of passing the TREN trace entry to the analyser (the second processing means) for processing.

Preferably, the step of reconstructing the application lifecycle further comprises loading the timestamp and virtual storage address of each trace entry into a memory means for future processing.

Preferably, the step of reconstructing the application lifecycle further comprises correlating the individual CICS tasks that make up an multi-region operation transaction using the CICS network unit-of-work ID.

Preferably, the step of reconstructing the application lifecycle further comprises extracting the unit-of-work ID from either the RM 0209 or RM FA01.

Preferably, every network unit-of work id is registered in a look-up table in order that each CICS task with the same network unit-of-work Id is treated as a single logical transaction.

Preferably, the step of reconstructing the application lifecycle further comprises trace entries that are associated to their transaction using the CICS task number TREN_TASK.

Preferably, the step of reconstructing the application lifecycle further comprises registering any new transaction upon receipt of an XM 1102 trace event that signifies an attachment of a new transaction.

Preferably, the step of reconstructing the application lifecycle further comprises transferring the complete reconstructed transaction to the third processing means.

Preferably, the step of reconstructing the application lifecycle further comprises writing the transaction detail that has been reconstructed by the second processing means to direct-access storage device data sets for visualisation by a user.

Preferably, writing the reconstructed application lifecycle to the second memory means comprises the steps of:
1. Writing the reconstructed transaction data to active detail data set of the second memory means;
2. updating the transaction summary record with a reference to the detail data set and pointer to the position in the detail data set established in the previous step;
3. Buffering transaction summary information into a summary buffer; and
4. When the summary buffer is full, or a small amount of time has expired then the summary buffer is written to the summary archive data set, else
5. When a summary or detail archive data set becomes full then a new archive data set is allocated and registered into the checkpoint data set, along with the timestamp of a first record in the archive data set.

According to a fourth aspect of the invention there is provided a method for taking a snapshot of an entire internal trace of one or more transaction server regions at a particular moment of time; the method comprises the steps of:
1. Locating CICS regions on the logical partition (LPAR) by following the address space control block (ASID/ASCB) chain using the standard technique for locating multiple virtual storage (MVS) address spaces;
2. Establishing a recovery (ESTAE) environment to detect and recover from abnormal endings (ABENDs) that occur if a CICS region suddenly becomes unavailable due to being shut down;
3. Establishing AR-mode cross-memory access to the CICS address space to access the control blocks of CICS and the internal trace that reside inside the CICS address space;
4. Verifying that the CICS address space is an active and eligible CICS region;
5. Locating the oldest internal trace buffer which immediately follows the active internal trace buffer (the buffer that is currently being written to by the transaction server) to establish the starting point (current internal trace buffer) of the snapshot;
6. Writing the trace entries stored in the current internal trace buffer to the auxiliary trace data set;
7. Positioning of the "current internal trace buffer" to the "next trace buffer";
8. Iteratively repeating steps 1 to 7 until positioning is back to the original "starting point" and one circuit of the internal trace has been completed meaning that the snap-shot process is complete and the auxiliary trace data set is closed and available for use.

According to a fifth aspect of the invention there is provided a method for reading a CICS internal trace, the method comprises the steps of
1. Locating CICS regions on the logical partition (LPAR);
2. Establishing a recovery (ESTAE) environment to detect and recover from abnormal endings (ABENDs) that occur if a CICS region suddenly becomes unavailable;
3. Establishing AR-mode cross-memory access to the CICS address space to access the control blocks of CICS and the internal trace that resides inside the CICS address space;
4. Verifying that the CICS address space is an active and eligible CICS region;
5. Locating the current internal trace buffer;
6. iteratively repeating steps 3 to 5 until all CICS region have been read;

7. Reading the traces entries of the internal trace for each of the CICS regions.

Preferably, the steps of locating the CICS regions comprises locating the CICS Regions via their job name at the corresponding LPAR by following the address space control block (ASID/ASCB) chain using the standard technique for locating multiple virtual storage (MVS) address spaces.

Preferably, the steps of verifying the the CICS address space is an active and eligible CICS Regions comprises the steps of verifying that:
1. the TCB field TCBCAUF must point to a valid CICS Authorized Function Control Block (AFCB);
2. the CSA field CSAXST indicates the CICS region that is executing;
3. the CSA field CSACIREL indicates that the CICS Transaction Server version is 4.2 (670) or higher to ensure that the internal trace is written in 64-bit storage;
4. the CSA indicates that the System Master Trace is on (CSATRSYS=1);
5. the DFHTRA Trace Anchor Block indicates that the internal trace is started (TRA_MASTER=1); and
6. the CICS domain tables anchored off the CICS domain table header (DFHKEDOH) indicates a minimum level of CICS trace categories being active.

Preferably, locating the current internal trace buffer comprises (1) using the DFHTRA Trace Anchor Block for locating the internal trace in 64 bit storage and (2) working back from the position in the (4K) buffer where the field TRA-NAB points, the previous buffer being the current internal trace buffer, which is the starting point for monitoring and reading the trace entries of the internal trace.

Preferably, the method of reading comprises examination of the current internal trace buffer to determine whether the internal trace is deemed to have wrapped because of the TREN_TIME timestamp of the first trace entry has changed and if TREN_TIME timestamp has changed shutting down monitoring.

Preferably, the method of reading further comprises examining the next internal trace buffer that immediately follows the current internal trace buffer examined to determine whether the current internal trace buffer is full by the CICS having written at least one new trace entry to the next buffer.

Preferably, the method of reading further comprises the step of comparing the TREN_TIME timestamps of the first trace entry in the current and next buffers and if the next TREN_TIME is greater than the current TREN_TIME then the current buffer is deemed to be full and ready.

Preferably, the method of reading further comprises the step of passing of the current internal trace buffer to the analyser when monitoring of the current internal trace buffer has deemed it to be ready.

Preferably, the method of reading further comprises the step of processing the next internal trace buffers as described in the two previous paragraphs until a maximum number of buffers have been processed.

Preferably, the method of reading further comprises optimising the maximum number of buffers to ensure that the first processing means has the highest chance of keeping up with the CICS writing new trace entries.

Preferably, the method of reading further comprises suspending monitoring of the CICS region when the current internal trace buffer is not ready for monitoring or the maximum number of trace buffers has been processed.

Preferably, the method of reading further comprises the step of suspending monitoring by an external command.

Preferably, the method of reading further comprises the step of recording the internal trace in a fourth processing means when the current internal trace buffer is passed to the first processing means when monitoring of the current internal trace buffer has deemed it to be ready.

Preferably, the reading of the trace entries occurs as close to the time that the trace entries are being written into the internal trace by the transaction server.

Preferably, the reading of the trace entries occurs as close to the time that the trace entries are being written into the internal trace by the transaction server.

According to a sixth aspect of the invention there is provided a method for gaining information about particular application and/or system events, and exception conditions generated during processing of a computer program or a transaction and stored in a CICS internal trace in the form of trace entries, the method comprises the steps of:
1. reading the CICS internal trace to obtain the trace entries;
2. storing the trace entries in memory means; and
3. reading the memory means to obtain information about particular application and/or system events, and exception conditions generated during processing of a computer program or a transaction Preferably, memory means comprises at least one auxiliary trace data set.

Preferably, the step of reading the internal trace comprises reading of the internal trace in accordance with the fifth aspect of the invention.

In an alternative arrangement, the step of reading comprises taking a snapshot of an entire internal trace in accordance with the fourth aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 3c is table identifying the CICS trace point IDs used to identify significant lifecycle events of an application program running in CICS;

DESCRIPTION OF EMBODIMENT(S)

Figure 1:
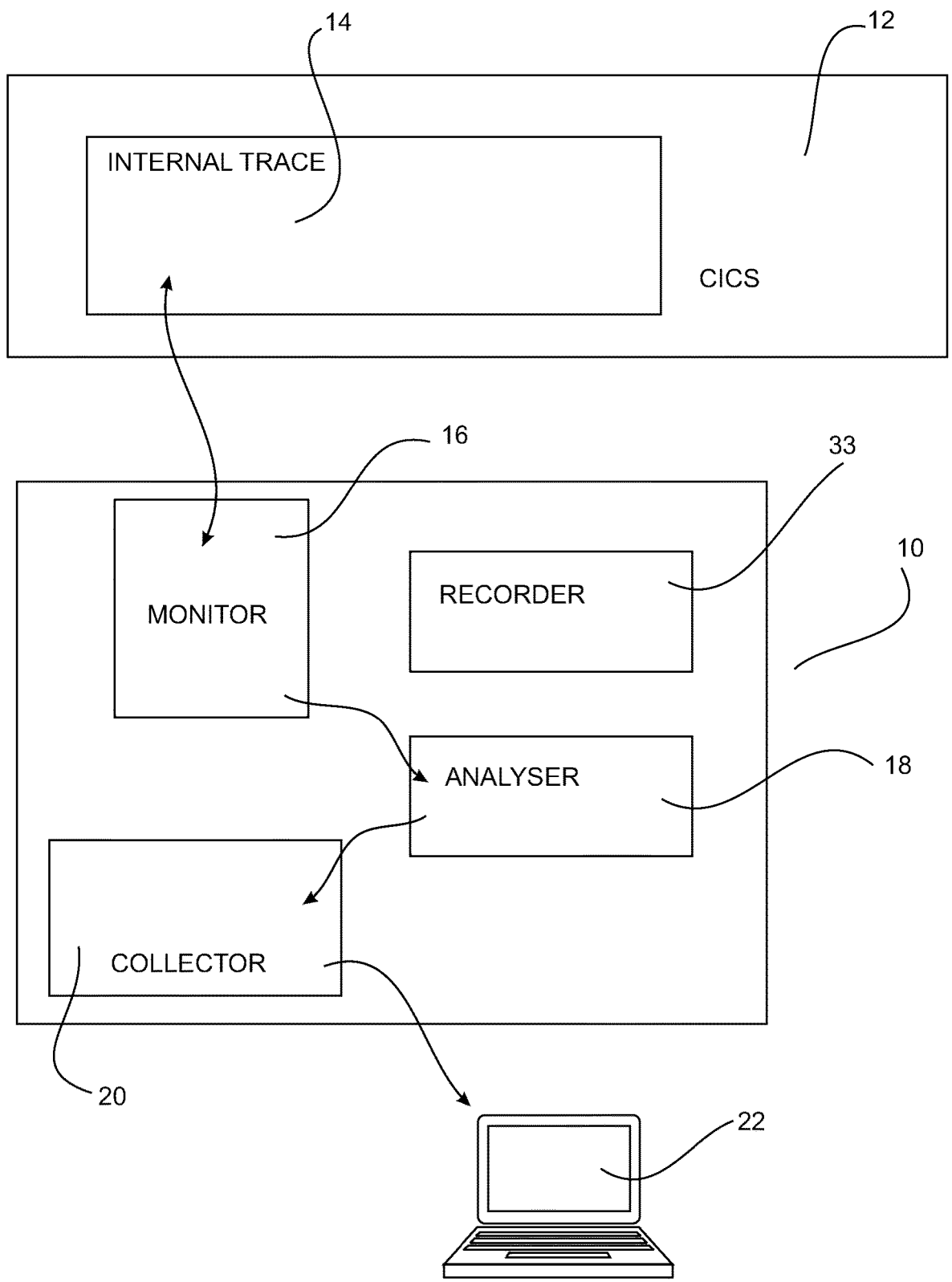
FIG. 1 is a schematic diagram of a first arrangement of the system for retrieving trace entries from a CICS in accordance with a first embodiment of the invention.

FIG. 1 shows a particular arrangement of a system 10 in accordance with a first embodiment of the invention. The system 10 is adapted to reconstruct the application lifecycle view of transactions processed by a transaction server such as a CICS transaction server 12 (referred to also as CICS).

The system 10 comprises a plurality of software modules (also referred to as processing means) linked together for reconstructing the application lifecycle view of transactions processed by the CICS 12.

The plurality of software modules comprises a monitor 16 (first processing means), an analyser 18 (second processing means), and a collector 20 (third processing means). To reconstruct the application lifecycle view of transactions processed by the CICS 12, the monitor 16, analyser 18 and a collector 20 are connected with respect to each other as illustrated in FIG. 1. The reconstructed application lifecycle view of transactions may be passed to display means 22 to allow visualization of the reconstructed application lifecycle view of the transactions by an end-user.

Each of the monitor 16, analyser 18 and collector 20 comprises discrete software modules that pass information and control between each other using internal application program interfaces (APIs). The software modules are link-edited together (using IEWL) to form a single full-function executable module defining the system 10. The single full-function executable module acts as the main program for the task (MVS address space in z/OS) that invokes the features of each of the software modules. The features are written using the IBM® High level Assembler (HLASM) language and utilize several z/OS operating system supplied macros and interfaces including cross-memory services.

The system 10 is adapted to interact with the internal trace 14 of the CICS 12 for reading the trace entries generated by CICS 12 during transaction processing and written to the internal trace 14. The system 10 is adapted to interact with the internal trace 14 in such a manner that the performance of the transaction processing being conducted in the CICS is not negatively impacted.

As mentioned in the Background art, conventionally, CICS auxiliary trace data sets are set up to store a record of trace entries. However, writing of the trace entries to the CICS auxiliary trace data set has an adverse effect on the performance of the transaction processing conducted by the CICS.

In accordance with a particular arrangement of the invention, the content of the internal trace is read by bypassing the CICS auxiliary trace and reading the trace entries directly from the internal trace. In accordance with this particular arrangement of the invention, there is provided a method (to be described at a later stage) for reading and interpreting the content of the internal trace in a period of time that is less than the period of time needed for an internal trace to become full and wrap losing the trace entries stored therein.

Moreover, another aspect of the method in accordance with this particular arrangement is that reading of the trace entries occurs substantially at the same time that the trace entries are being written into the internal trace by the transaction server. For example, reading of the trace entries occurs as close to the time that the trace entries are being written into the internal trace). This minimises the chance of data loss due to the wrap-around nature of the internal trace.

Reading of the internal trace 14 is accomplished by the monitor 16. During reading of the internal trace 14 of the CICS 12, the monitor 16 passes the CICS trace entries to the analyser 18.

The analyser 18 reconstructs the application lifecycle view of transactions processed by the CICS 12 using the trace entries provided by the monitor 16. The reconstructed application lifecycle view is passed to the collector 20.

The collector 20 writes the reconstructed transaction information to data sets 24. The application lifecycle view may be visualized by a user through a user interface such as the display 22. By visualising the application lifecycle view it is possible to evaluate the transaction processing conducted in the CICS 12.

Figure 2A:
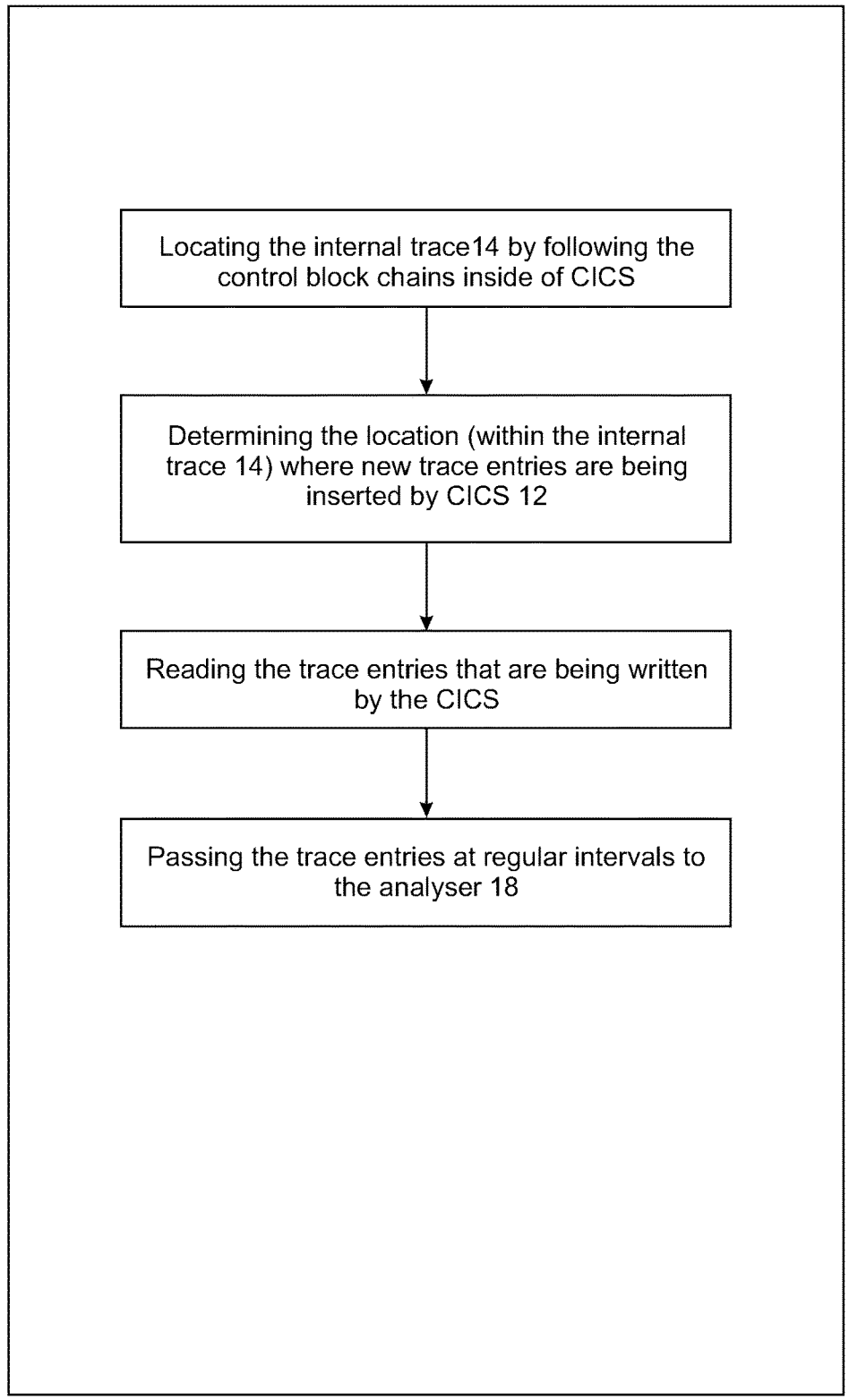
FIG. 2a is a schematic diagram of the method for reading the trace entries conducted in the monitor of the system shown in FIG. 1.

Referring now to FIG. 2,

FIG. 2*a* shows a schematic view of the process undertaking in the monitor 16 for reading the internal trace 12.

As mentioned before, the monitor 16 reads the internal trace of the CICS 12. For this, the monitor 16 runs APF authorised to gain access to the CICS using cross-memory services.

[Initially, the location of the internal trace 14 needs to be determined. The monitor 16 locates the internal trace 14 by following the control block chains inside of CICS. Once the internal trace 14 has been located, it is necessary to determine the location (within the internal trace 14) where new entries are being inserted by CICS 12. At that particular location of the internal trace 14, the monitor 16 starts reading the trace entries that are being written by the CICS 12 thereon. At regular intervals, the monitor 16 passes the trace entries that are being read to the analyser 18.

The monitor 16 is adapted to adjust to the speed at which the trace entries are being written. This is particularly advantageous because it permits adjusting the reading speed of the monitor 16 to synchronise with the speed that the trace entries are being written onto the internal trace 14 by the CICS.

To control the speed at which the monitor 16 reads the internal trace 14, the present embodiment of the invention provides a method for reading the internal trace 14. In an arrangement, the monitor 16 may be adapted to read the internal trace 14 in a period of time that is less than the period of time needed for an internal trace 14 to become full and wrap losing the trace entries stored in the internal trace. In another arrangement, the monitor 16 is adapted to read the internal trace 14 at substantially the same time that the trace entries are being written into the internal trace 14. In a particular arrangement, the monitor 16 reads up to 2048 trace buffers per second and could handle wrapping of the internal trace 14 every two seconds.

Figure 2B:
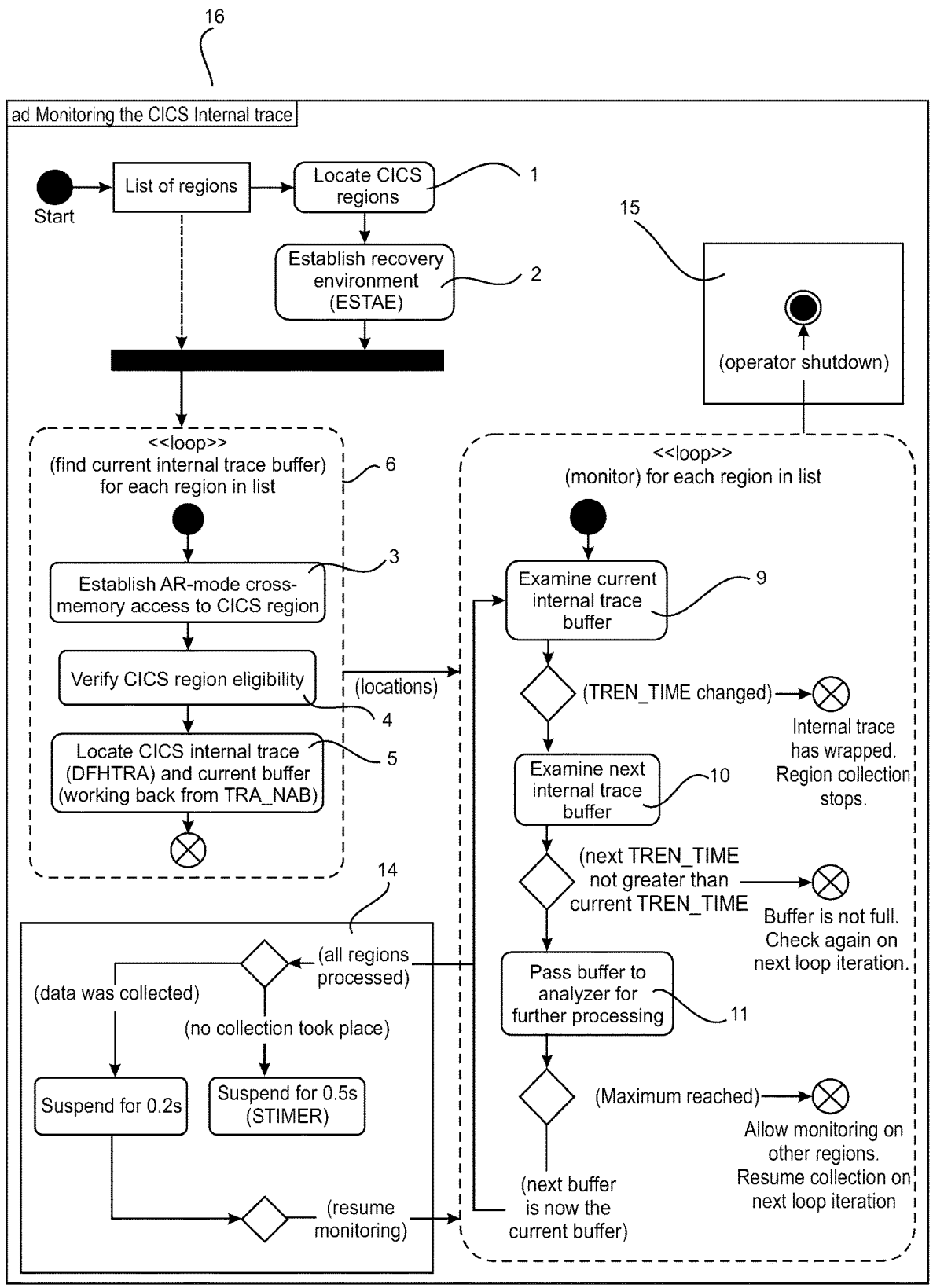
FIG. 2b is a detailed diagram illustrating the method for reading the trace entries conducted in the monitor of the system shown in FIG. 1.

FIG. 2*b* shows a flowchart outlining in detail the process undertaking in the monitor 16 for reading the internal trace 12.

Referring to FIG. 2*b*, the first step 1 refers to the process for locating CICS regions. The CICS regions to be monitored for reading of the internal trace are identified by their job name, The job name allows each CICS region to be located on the logical partition (LPAR) by following the address space control block (ASID/ASCB) chain using the standard technique for locating multiple virtual storage (MVS) address spaces.

Subsequently, step 2 is conducted. Step 2 establishes a recovery (ESTAE) environment. The purpose of the ESTAE environment is to detect and recover from abnormal endings (ABENDs) that occur if a particular CICS region suddenly becomes unavailable due to being shut down. This facilitates an orderly shutdown of the monitoring process of the CICS region and facilitates continuation of the monitoring process of other still active CICS regions. Establishing the ESTAE environment is required because no formal notification is issued to the monitor 16 that the particular CICS region has been shut down. No notification is issued by the CICS region to the monitor 16 due the fact the process in accordance with the present embodiment of the invention operates independently of and unbeknownst to the operation of the CICS.

Step 3 establishes the AR-mode cross-memory access to the CICS address space. This provides the monitor 16 with the ability to access the control blocks of CICS and the internal trace 14 that reside inside the CICS address space.

Step 4 verifies that the GIGS address space is an active and eligible CICS region. This is accomplished by verifying that:

The TCB field TCBCAUF must point to a valid GIGS Authorized Function Control Block (AFCB);

The GSA field CSAXST must indicate the CICS region that is executing;

In accordance with the present embodiment of the invention, the CSA field CSACIREL should indicate CICS Transaction Server version be 4.2 (670) or higher to ensure that the internal trace is written in 64-bit storage;

The CSA should indicate that the System Master Trace is on (CSATRSYS=1);

The DFHTRA Trace Anchor Block should indicate that the internal trace is started (TRA_MASTER=1);

The CICS domain tables anchored off the CICS domain table header (DFHKEDOH) must indicate a minimum level of CICS trace categories being active. In accordance with the present embodiment of the invention Levels AP 1, EI 1 or 2, LD 1, PG 1, RA 1, RI 1, RM 1, XM 1 and XS 1 are required.

Step 5 relates to locating the internal trace 14 and current internal trace buffer. In particular, The DFHTRA Trace Anchor Block is used to locate the internal trace 14 in 64-bit storage. Field TRA_NAB points to the position in the (4K) buffer where GIGS will write the next trace entry. Working back from TRA_NAB, the previous buffer is the starting point for monitoring and reading the trace entries of the internal trace 14. This buffer is the most recent complete internal trace buffer, referred to from now on as the "current internal trace buffer" and that will be the next buffer to be analysed.

Step 6 relates to the iteration of Steps 3 to 5 (see paragraphs [0074] to [00107] for every CICS region to be monitored.

Step 7 relates to the next pointer continuously traversing the internal trace 14 (which wraps around from TRA_INT-TAB_PTR to TRA_ENDTAB_PTR). For this, each 4K trace buffer has a prefix that starts with two 64-bit pointers to the next and previous buffers.

At Step 8 the monitoring process of the internal trace 14 starts reading of the trace entries. Monitoring starts from the internal trace starting points established in step 5 (see paragraph [0076]). Each CICS region is monitored by processing the following steps 9 to 13 (see paragraphs [0110] to [00117] below) for each CICS region one at a time.

Step 9 examines the current internal trace buffer obtained in step 5 (see paragraph [0076]). If the TREN_TIME timestamp of the first trace entry has changed (since the buffer was first examined) then the internal trace is deemed to have wrapped and monitoring 16 is shut down. This happens when CICS is writing trace entries too quickly when compared to the speed of the monitoring process. Under these circumstances, the monitoring stops and corrective action must be taken. An example of a corrective action is to increase the size of the internal trace table.

Step 10 examines the next internal trace buffer that immediately follows the current internal trace buffer examined in step 9. The current buffer is deemed to be full and ready for monitoring when CICS has written at least one new trace entry to the next buffer. This is determined by comparing the TREN_TIME timestamps of the first trace entry in the current and next buffers. If the next TREN_TIME is greater than the current TREN_TIME then the current buffer is deemed to be full and ready.

Step 11 relates to passing of the current internal trace buffer to the analyser when monitoring of the current internal trace buffer has deemed it to be ready. As will be described below in a particular arrangement there may be provided a fourth processing means (referred to as recorder 33) for providing a continuous recording of the internal trace 14.

Upon successful completion of and return from the analyser 18 (and in the particular arrangement having the recorder 33, from the recorder 33 as well), the "next internal trace buffer" becomes the "current internal trace buffer". Internal Trace buffers for the CICS region continue to be processed from step 9 to step 11 (see paragraphs [0110] to [0113]) until a "maximum" number of buffers have been processed.

The "maximum" number is optimized to ensure that the monitor:
  a. Has the highest chance of keeping up with how fast CICS is writing new trace entries
  b. Shares its time equally amongst all regions being monitored.

The maximum number is calculated as one eighth the size of the entire CICS internal trace to a maximum of 4 megabytes (1024 internal trace buffers)

Step 12 relates to suspending monitoring of the CICS region when the current internal trace buffer is not ready for monitoring or the maximum number of trace buffers has been processed.

Step 13 relates to resuming step 9 for monitoring of the next CICS region.

Step 14 occurs when all CICS regions have been monitored using steps 9 to 13 (see paragraphs [0110] to [0117]). At this stage, monitoring is suspended for a short period of time to ensure that the monitor does not use excessive amounts of CPU resources. The suspension time depends on the actions taken:
  a. When the "next internal trace buffer" is ready because CICS 12 is writing to the internal trace 14 quickly (transaction rate is high) then the monitor 16 is suspended for 0.01 seconds (STIMER WAIT).
  b. When the "next internal trace buffer" is not ready because CICS 12 is writing to the internal trace 14 slowing (transaction rate is low) then the monitor 16 is suspended for 0.5 seconds.

The process from step 9 to 14 (see paragraphs [0110] to [0118]) is continuously repeated until an external command (for example an operator intervention) causes the monitor to shut down—see item 15 in FIG. 2b.

In a particular arrangement, there may be provided a further software module (a fourth processing means) referred to as a recorder 33. The recorder 33 reads the CICS internal trace entries and writes the trace entries on a memory means such as one or more auxiliary data sets. Thus, the recorder 33 provides a continuous recording of the trace entries of the internal trace 14. Recording of the trace entries occur at step 11 (see paragraph [0112]), The memory means for storing the trace entries may comprise an auxiliary trace data set.

Further, as mentioned before, the information read by the monitor 16 is passed to the analyser 18 for the reconstruction of the transaction lifecycle view of the transaction processing occurring in the CICS 12.

Figure 3A:
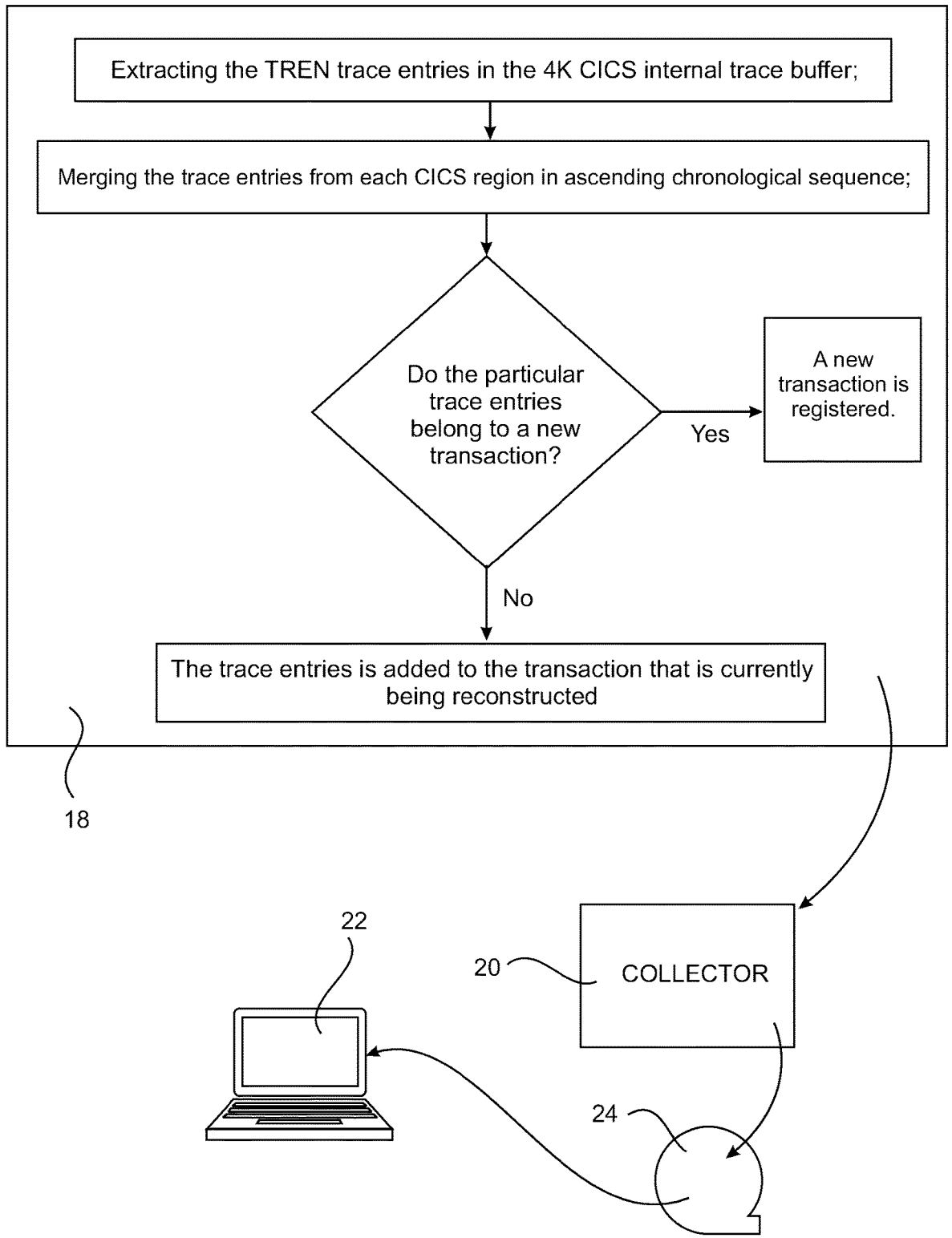
FIG. 3a is a schematic diagram of the method to progressively reconstruct the transaction processed by CICS conducted in the analyser of the system shown in FIG. 1.

FIG. 3a shows a schematic view of the process occurring in the analyser 18. The analyser 18 uses the trace entries to progressively reconstruct the transactions processed by CICS 12. In particular, the reconstructed transactions are obtained by interpreting the trace entries. In a particular arrangement approximately 30 trace entry types identified by their "point id" are used in the reconstruction process.

The transaction information of the reconstructed transaction provided by the analyser 18 includes:
 a. Overall transaction response time provided by the task start and end events.
 b. The program flow within the overall transaction, obtained by following subroutine program calls (EXEC CICS LINK) and exit calls;
 c. An itemization of every application call made by the transaction including EXEC CICS, EXEC SQL (DB2), EXEC MQ, EXEC DLI (IMS-DBCTL) and JCICS (Java);
 d. An account for any additional overhead processing including first dispatch and syncpoint; and
 e. A summary of the itemized application calls to provide an overall transaction response time breakdown by the components described above in c and d.

Figure 3B:
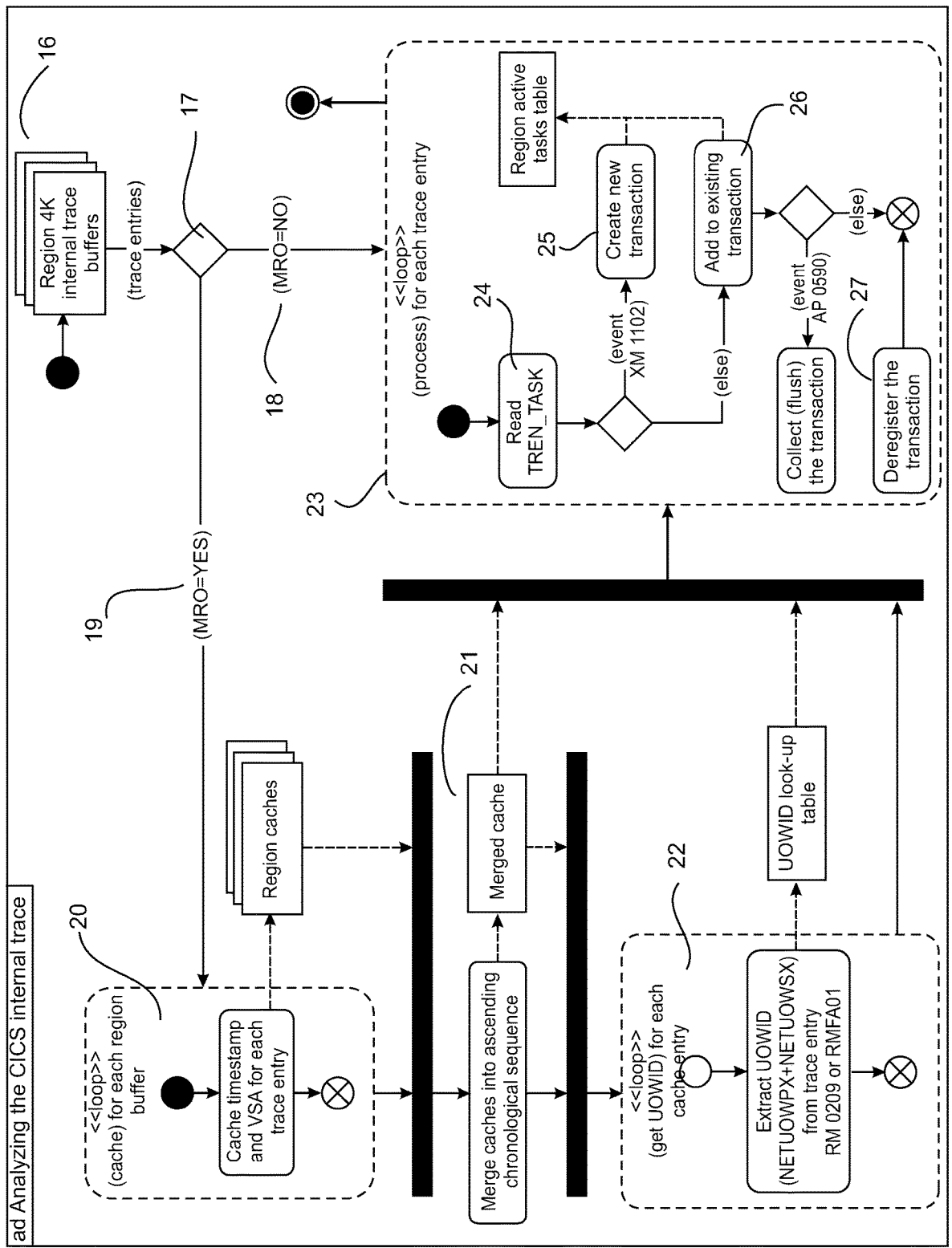
FIG. 3b is a detailed diagram illustrating the method to progressively reconstruct the transaction processed by the CICS conducted in the analyser of the system shown in FIG. 1.

FIG. 3b shows a flowchart outlining in detail the process undertaken in the analyser 18. As mentioned before, the purpose of the analyser 18 is to reconstruct (based on the information provided by the monitor 16) how the transactions were processed by CICS.

Referring to FIG. 3b, in Step 16, each TREN trace entry in the 4K CICS internal trace buffer is extracted and passed on to the analyser 18 for processing.

At Step 17, it is established (based on user customization options) whether the analyser 18 is to either (1) consolidate the MRO operations into a single transaction (MRO=YES) or (2) treat each CICS region separately (MRO=NO)

As will be described at a later stage, the analyser is adapted to support CICS multi-region operation (MRO). Multi-region operation occurs when a single transaction distributes its workload across multiple CICS regions. Single-region operation occurs when a single transaction processed its workload entirely on a single CICS region.

At step 18, when MRO=NO then proceed to step 23 (see paragraph [00105]) below.

At step 19 and 20 when MRO=YES then the analyser 18 merges the trace entries from each CICS MRO region in ascending chronological sequence. The multiple CICS traces are treated as a single logical trace. The analyser 18 cannot proceed until the trace entries for each CICS MRO region have been transferred from the monitor 16 to the analyser 18.

For each MRO CICS region, the timestamp and virtual storage address (VSA) of each trace entry is loaded into a memory means (referred to as cache) for future processing. The purpose of the cache is to facilitate the process of merging the trace entries from each MRO CICS region.

In accordance with the present embodiment of the invention, the respective caches for each CICS region are merged, rather than the actual internal trace buffers.

This has two advantages:
 a. Avoids cross-memory context switching when comparing the timestamp of the active trace entry for each CICS system
 b. The cache can be large enough to provide a read-ahead of trace entries, avoiding a return back to the monitor to request more internal trace buffers At step 21, after step 20 (see paragraph [0099]) has been performed for all CICS MRO regions, the chronological merge of trace entries proceeds using the cache.

At step 22, the individual CICS tasks that make up an MRO transaction are correlated by the CICS network unit-of-work ID (UOWID). This unique token is a composite of the network unit-of-work ID prefix (NETUOWPX) and network unit-of-work ID suffix (NETUOWSX). The UOWID is extracted from either the RM 0209 or RM FA01 trace entry, depending on what is available. MRO=YES processing cannot proceed without these tokens being present in the trace entry. Every network unit-of-work id is registered in a look-up table (for example a hash table). Each CICS task with the same network unit-of-work id is connected by the table entry and treated as a single logical transaction.

At step 23, trace entries are processed one at a time.

At step 24, trace entries are associated to their transaction using the CICS task number TREN_TASK. This number is unique for the life of the transaction and is used to correlate the trace events back to the transaction. The analyser keeps one table per CICS region of active tasks (transactions) keyed by task number (1-99999).

After completion of step 24, it is decided whether a particular trace entry (that has been received from the monitor 16 and is currently being processed) belongs to the transaction that is currently being reconstructed or whether the particular trace entry is part of a new transaction.

At step 25, new transactions are registered upon receipt of an XM 1102 trace event that signifies an attachment of a new transaction.

At step 26, subsequent selected trace entries are used to complete the transaction lifecycle of the transaction that is currently being reconstructed. FIG. 3c shows a table identifying the CICS trace point Ds used to identify significant application lifecycle events; EXEC CICS calls, DB2, MQ and IMS calls and links to other programs, These events are used to build up the identification and performance information about the transaction.

Prior step 27, it is decided whether there are no more trace entries for the particular transaction that is being reconstructed. If there are no more trace entries step 27 described below is performed; if there are more trace entries, the steps 24 to 26 (see paragraphs [00107] to [00109]) are repeated until there are no more trace entries for the particular transaction. Issuance of an AP 0590 trace event indicates the end of the transaction.

At step 27, the transaction ends upon receipt of an AP 0590 trace event. The complete reconstructed transaction is transferred to the collector 20 and deregistered (the CICS task number is freed and re-eligible for a future transaction).

At this stage, the collector 20 writes the transaction detail that has been reconstructed by the analyser 18 to direct-access storage device (DASD) data sets 24. This makes transaction details available for visualization by users through a user interface such as a display 22.

The data sets 24 are dynamically allocated on demand and registered into the checkpoint data set of the collector 20. The user interface reads the checkpoint and archive data of the collector 20 in order to display the reconstructed transaction information to the user. In particular, the required archive data sets (for the user requested time period) are selected and the corresponding screens are built to convey information about the transaction, that has been reconstructed, to the user.

The information about all transactions or a particular selected transaction may include:
   a. A list of transactions and the performance characteristics of each transaction.
   b. A program flow and application events of a particular transaction selected by the user; each formatted to look like the original application program calls.
   c. A view of the trace events of the particular transactions; the view may be for the entire transaction or individual application calls.

The user may analyse, for example, performance of a particular transaction by selecting the particular transaction so that the transaction information of the particular transaction is displayed on the display 22.

[The collector is adapted (through an API) to locate and extract trace information about a single transaction as quickly as possible; all the while supporting an environment of potentially billions of transactions processed over several months.

To achieve this, the data model of the DASD data sets 24 adopts a three tiered approach-summary, detail and checkpoint.

Trace data is collected into two archive data sets:

The summary archive contains one record per transaction and is designed for a quick search of transactions by:
   d. Time—indicating when the transaction was processed
   e. Identification—indicating the CICS region where the transaction was processed, the transaction ID and programs used, the security user ID
   f. Performance—indicating transaction response time broken down into its components including EXEC CICS, DB2, MQ and IMS, and abnormal ending (ABEND).

The detail archive data set contains the trace entries for every transaction in the summary archive data set. It is designed for quick access to the trace records of any transaction selected from the summary archive.

Figure 4A:
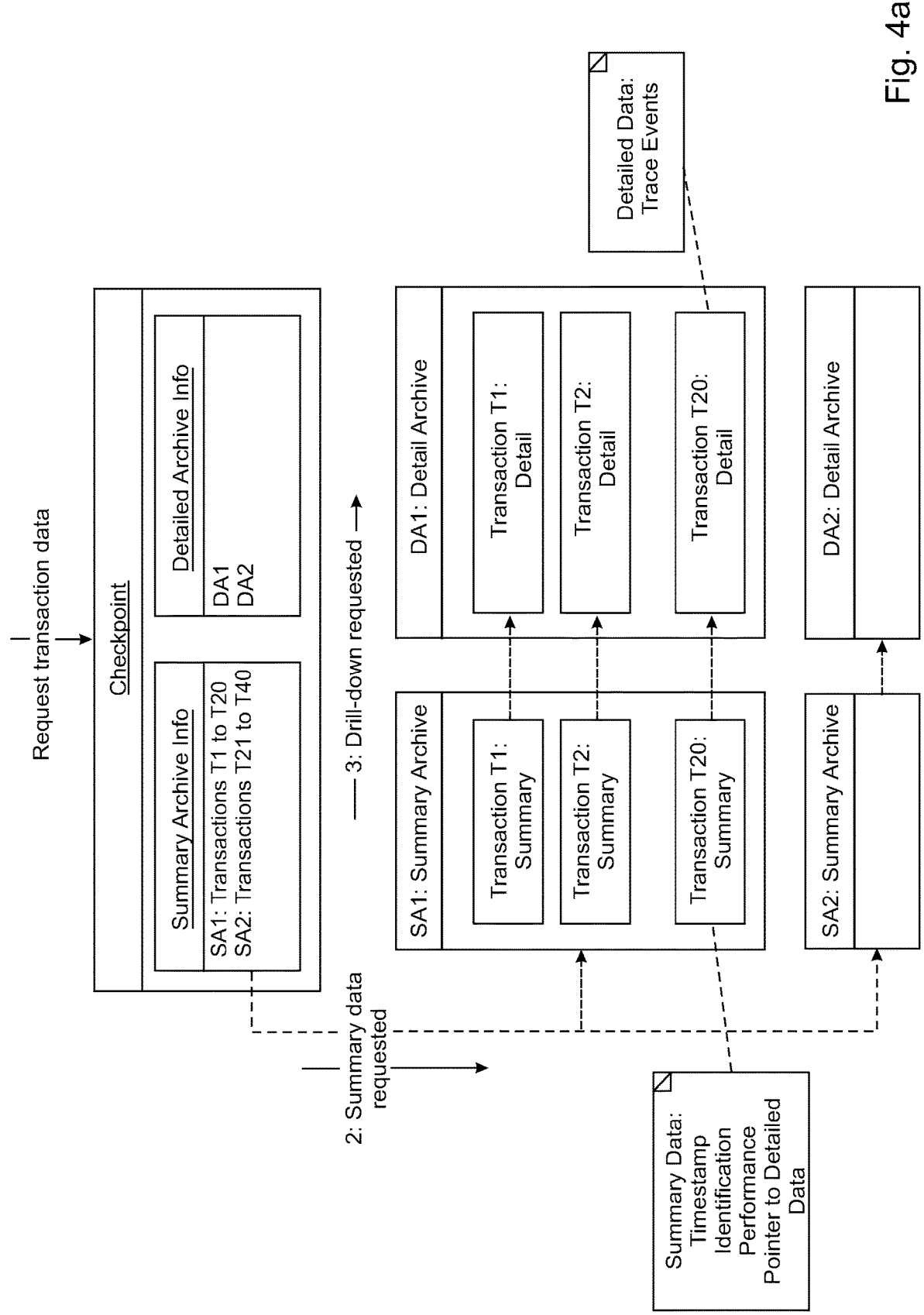
FIG. 4a is a diagram illustrating the data model of the collector of the system of FIG. 1.

FIG. 4a shows a diagram illustrating this relationship.

Summary and detail archive data sets are allocated on demand. When one data set fills then a new one is allocated, This approach provides for better data management:
   a. Archive data is retained using the minimum amount of DASD. No monolithic databases need to be pre-allocated
   b. Old archive data can be expired (deleted) at the data set level. No expensive data expiration process need occur.

The checkpoint data set contains a register of every summary and detail archive data set allocated and is designed to quickly identify the archive data sets that span a particular time range.

Figure 4B:
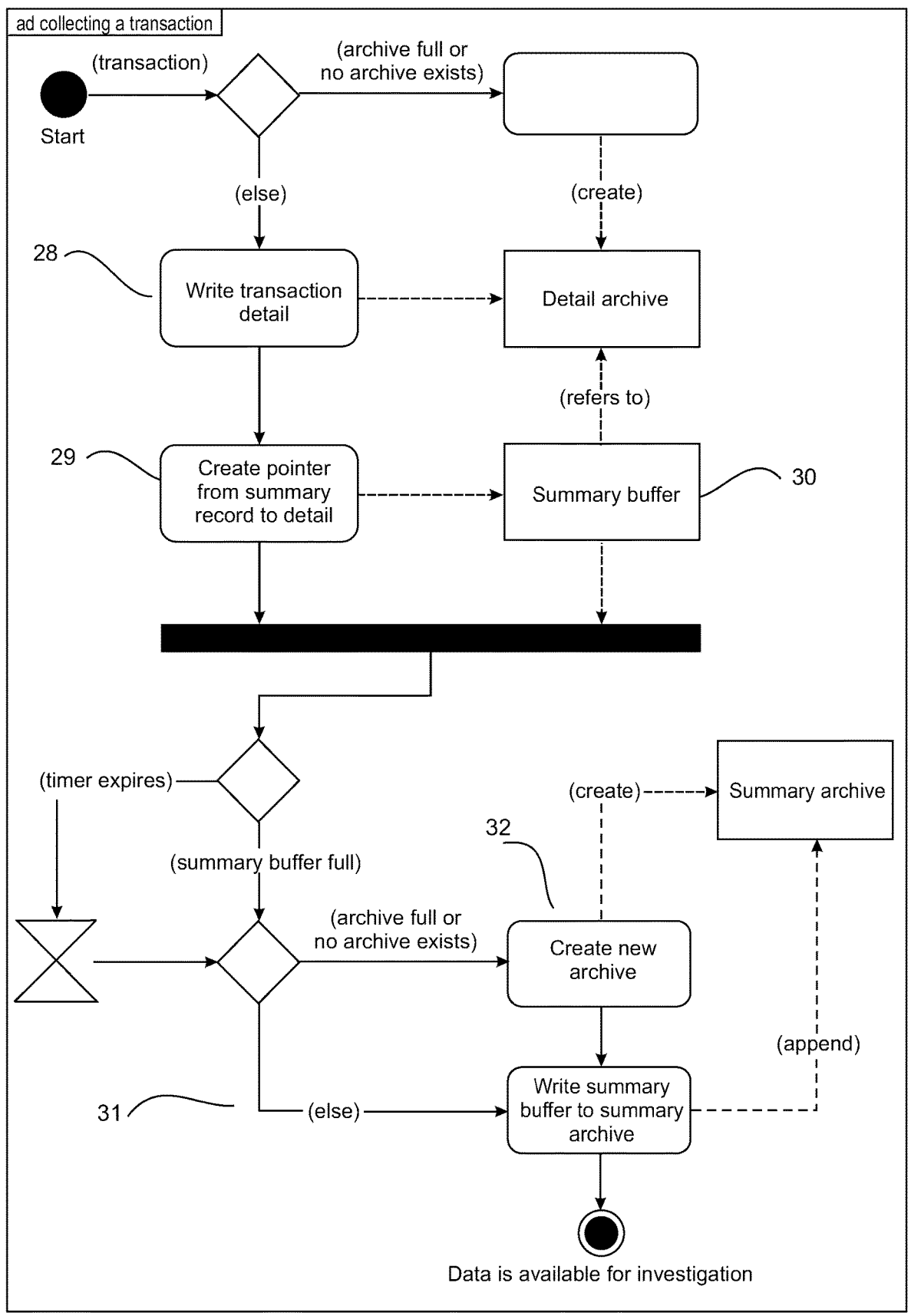
FIG. 4b is a detailed diagram illustrating the method of writing complete transactions to external data sources.

FIG. 4b shows a diagram explaining the data design in terms of an individual transaction being collected and the data becoming available for investigation from the user interface 22.

The following steps are used to collect trace data for transactions:

At step 28, the transaction trace data is written to the active detail data set. The detail data set name and position of the trace data in the data set is noted (Note macro returns the TTTR).

At step 29, the transaction summary record is updated with a reference to the detail data set and pointer to the position in the detail data set established in step 28 (see paragraph) [00126].

At step 30, the transaction summary information is buffered into the summary buffer.

At step 31, when the summary buffer is full, or a small amount of time has expired then the summary buffer is written to the summary archive data set. At this point the transaction summary and detail information is available for investigation.

At step 32, when a summary or detail archive data set becomes full then a switch process occurs, A new archive data set is allocated and registered into the checkpoint data set, along with the timestamp of the first record in the archive data set (to facilitate time-based archive data set selection)

Figure 5:
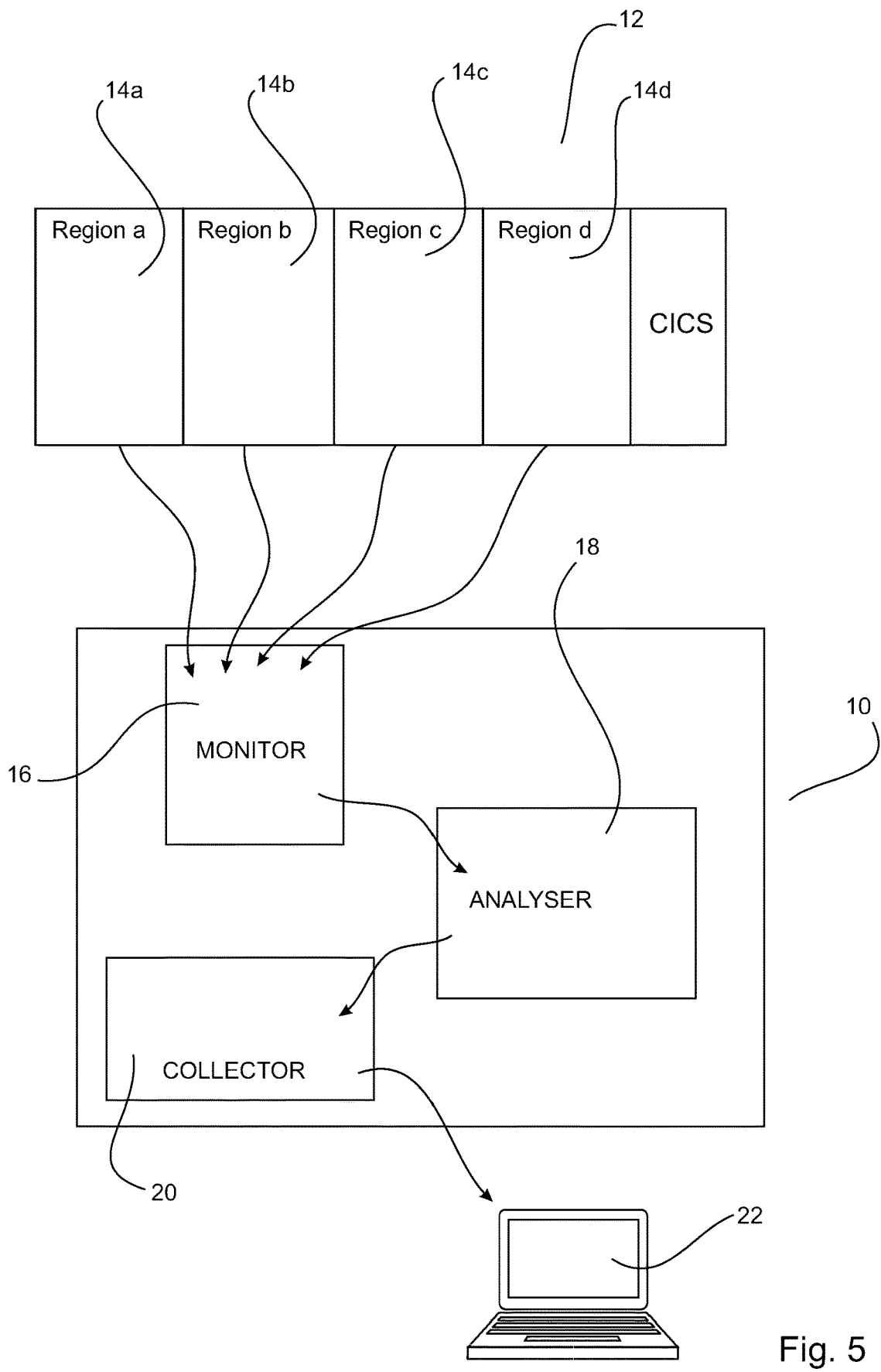
FIG. 5 is a schematic diagram of the system for retrieving trace entries during a multi-region operation from a CICS in accordance with the first embodiment of the invention.

Referring now to FIG. 5.

It was mentioned before that a single transaction may be processed either in a single region of the CICS 12 or in multiple (MRO) CICS regions.

In accordance with another arrangement of the first embodiment for the invention, it is possible to reconstruct a particular transaction that is being run in a plurality of regions of the CICS 12. In particular, distinct parts of a particular transaction may be processed in different CICS regions. This is possible through multi-region operation (MRO) that provides transaction routing, function shipping and distributed program link (DPL) services allowing distinct parts of a single transaction to be processed across a plurality of CICS regions.

FIG. 5 shows a schematic view of a CICS comprising four regions (regions a, b, c and d). The particular arrangement of the system 10 shown in FIG. 4 is adapted to reconstruct transactions that have been processed across a plurality of CICS regions. In particular, this particular arrangement permits analysis of a particular transaction (also referred to as a MRO transaction) that runs across a plurality of CICS regions. In this particular arrangement, the monitor 16 is adapted to read the trace entries across all of the CICS regions used for processing a particular transaction. The MRO transaction may be studied in a single application view. This is done by consolidating, in a single application view, all trace entries written in the internal traces in the plurality CICS regions where the particular transaction was processed.

The analyser 18 is adapted to merge the trace entries of all CICS regions to deliver the single application view. The analyser 18 is also adapted to correlate the trace entries generated by all CICS regions to the particular transaction that originated them. In particular, the trace entries of multiple CICS regions (located in separately addressable multiple virtual storage (MVS) address spaces) are merged in chronological order and the trace entries of each CICS region for a single transaction need to be correlated to provide a consolidated picture of the entire transaction processed in the plurality of CICS regions.

Referring back to FIG. 1, in a particular arrangement of the present embodiment of the invention there is provided a system for continuously recording the trace entries of the internal trace 14. This arrangement is particularly useful because it comprises a CICS auxiliary trace function in parallel with the processes conducted by the analyser 18 and collector 20.

This particular arrangement comprises the recorder 33 (the fourth processing means) for writing the trace entries of the CICS internal trace entries on a memory means such as an auxiliary trace data set. The fact that it uses an auxiliary trace data set provides the CICS auxiliary trace function in parallel with the processes conducted by the analyser 18 and collector 20.

Figure 6:
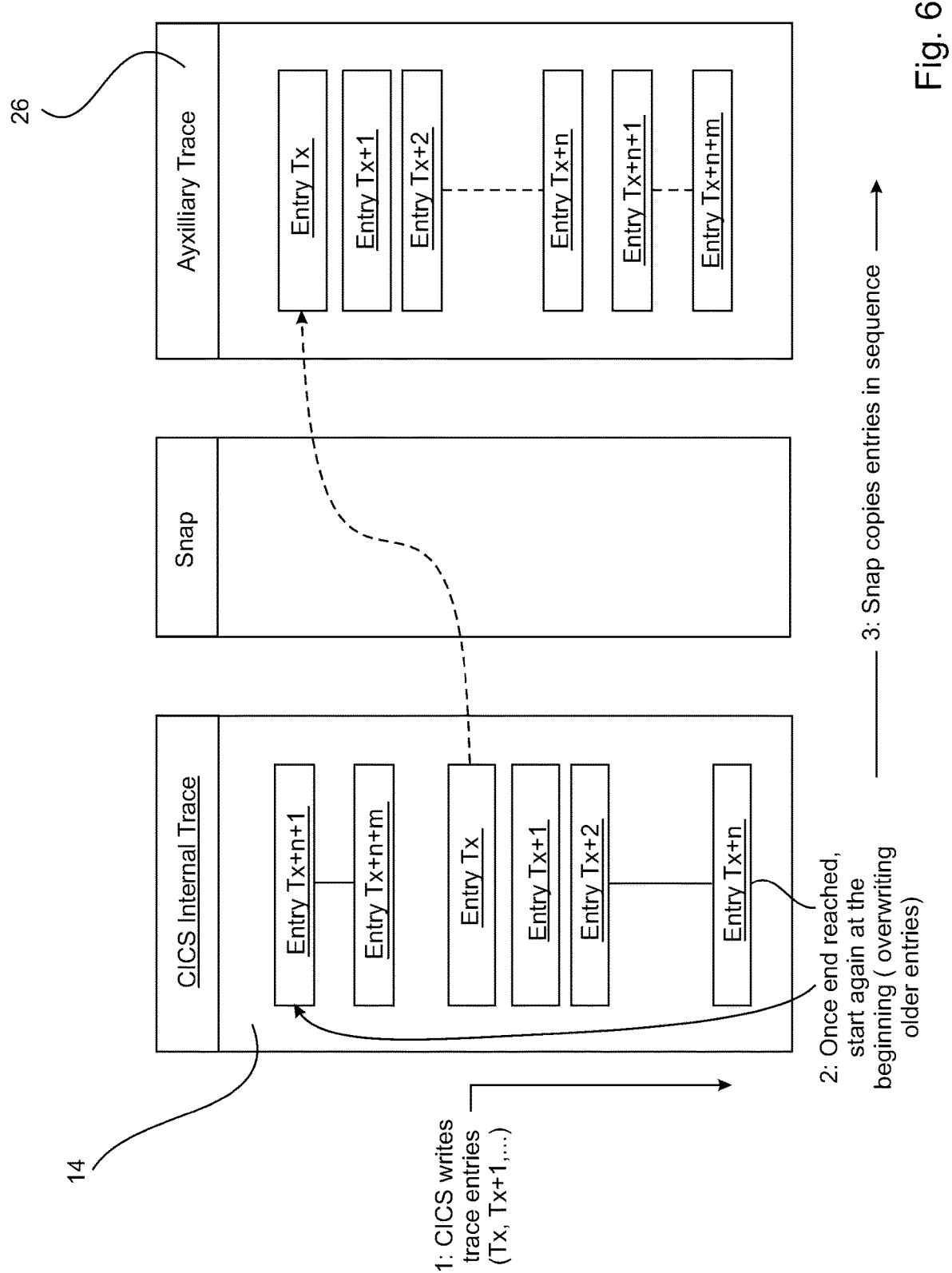
FIG. 6 is a schematic diagram of the system for taking a snap-shot from a CICS region in accordance with a second embodiment of the invention.

Referring now to FIG. 6. FIG. 6 shows a second embodiment of the invention.

In accordance with the second embodiment of the invention, the system 10 may provide a point-in-time snapshot of the internal trace 14 of the CICS 12; for example, a snapshot of the entire internal trace of one or more regions of the CICS 12 at a particular moment of time may be taken. The information registered by the snapshot may then be written to a DASD data set 26 located externally from the CICS. This external data set 24 can then be processed as a conventional CICS auxiliary trace data set (discussed in the Background Section) using standard CICS supplied utilities or the interactive user interface provided with the present embodiments of the invention.

In accordance with a particular arrangement of the second embodiment of the invention, the snap-shot is taken of trace entries that have already been written until the point in time of the snapshot. In this arrangement for taking the snap-shot the reading process starts with the oldest trace buffer in the CICS internal trace and from there moving forward until one circuit of the internal trace is completed.

This is different when compared to what occurs in the monitoring process of the monitor 16 described earlier. In the monitor 16 the monitor waits for new trace entries to be created by the CICS region 12.

The process of taking the snap-shot starts with steps 1 to 5 that were described earlier in relation to the monitoring method of the monitor 16. These steps 1 to 5 are used to locate the DFHTRA Trace Anchor Block control block in the CICS address space.

Subsequently, the oldest internal trace buffer which immediately follows the active internal trace buffer (the buffer that is currently being written to by the transaction server) is located to establish the starting point (current internal trace buffer) of the snapshot;

In particular, the field TRA_NAB points to the position in the (4K) internal trace buffer where CICS will write the next trace entries. Working forwards from TRA_NAB, the next trace buffer is the starting point for taking the snap-shot. This buffer is the oldest internal trace buffer, the "starting point" and referred to from now on as the "current internal trace buffer"—effectively the next buffer to be read.

After the 4K "current internal trace buffer" has been read the corresponding trace entries are written to the auxiliary trace data set.

Subsequently, the "next trace buffer" (written after the "current internal trace buffer") is read and the corresponding trace entries are written to the auxiliary trace data set. This process is repeated until positioning is back to the "starting point".

If positioning is back to the original "starting point" then one circuit of the internal trace has been completed. This means that the snap-shot process is complete and the auxiliary trace data set 26 is closed and available for viewing.

If positioning is not back to the original "starting point" than a further 4K "current internal trace buffer" is written to the auxiliary trace data set reiterating this process until positioning is back to the original "starting point" and one circuit of the internal trace has been completed.

Modifications and variations as would be apparent to a skilled addressee are deemed to be within the scope of the present invention. By way of example, the system and method according to the invention may be applicable to other IBM® z/OS mainframe subsystems that use an internal trace table; including other CICS trace tables, IMS, DB2, WebSphere Application Server, IBM® MQ and the z/OS operating system itself.

Further, it should be appreciated that the scope of the invention is not limited to the scope of the embodiments disclosed.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A computing system for obtaining information about at least one of particular application events and system events, and exception conditions generated during processing of a computer program or a transaction and stored in an internal trace of a transaction server in a form of trace entries, the computing system comprising:
a first computing module to read the internal trace of the transaction server to obtain trace entries written in the internal trace of the transaction server, and storage devices for storing the trace entries therein,
wherein the first computing module is adapted to adjust a speed at which the trace entries are being written onto the internal trace.

2. A computing system according to claim 1 wherein the storage devices comprise at least one auxiliary trace data set.

3. A computing system according to claim 1 wherein the first computing module is adapted to read the internal trace in a period of time that is less than a period of time for an internal trace to become full and wrap resulting in the trace entries stored in the internal trace being lost.

4. A computing system according to claim 1 wherein the first computing module is adapted to read the internal trace at substantially a same time that the trace entries are being written into the internal trace.

5. A computing system for reconstructing an application lifecycle view of transactions processed by a transaction server, the computing system comprising:
first storage devices adapted to collect trace entries that are generated during transaction processing, and further adapted to store the trace entries,
second storage devices adapted to reconstruct the transactions using the collected trace entries, and
third storage devices adapted to store the reconstructed transactions for visualization by a user,
wherein the first storage devices and the second storage devices are coupled to transfer the trace entries from the first storage devices to the second storage devices, and the second storage devices and the third storage devices are coupled to transfer the reconstructed transactions to the third for storage devices to store the reconstructed transactions to permit visualization by the user through a user interface, and
wherein the computing system further comprises a first computing module to continuously read an internal trace of the transaction server and to write the trace entries on the first storage devices.

6. A computing system according to claim 5 wherein the trace entries are generated when either (1) the transaction server or an application program performs a function generating an application or system event or (2) the transaction server detects an exception condition.

7. A computing system according to claim 5 wherein the transaction server comprises a CICS® Transaction Server.

8. A computing system according to claim 5 wherein the second storage devices comprise direct-access storage devices for collecting trace data.

9. A computing system according to claim 5 wherein a data model of the second storage devices is based on a three tiered approach comprising summary, detail and checkpoint to allow an end-user interface to locate and extract information of the reconstructed transactions in a relatively short period of time.

10. A computing system according to claim 8 wherein the trace data is collected into a summary archive and a detail archive.

11. A computing system according to claim 10 wherein the summary archive contains one record per transaction and is designed for a quick search of the transactions by:
  1. identifying when a transaction was processed;
  2. identifying a region of the transaction server where the transaction was processed, a transaction ID and programs used, a security user ID; and
  3. indicating transaction response time being broken down into its components including EXEC CICS, DB2, MQ and IMS, and abnormal ending.

12. A computing system according to claim 10 wherein the detail archive contains the trace entries for every transaction included in the summary archives.

13. A computing system according to claim 5 wherein the first storage devices comprise at least one auxiliary trace data set.

14. A method for reading an internal trace of a transaction server, the method comprises the steps of
  1. locating regions of the transaction server on a logical partition;
  2. establishing a recovery environment to detect and recover from abnormal endings that occur if a region of the transaction server suddenly becomes unavailable;
  3. establishing access register mode cross-memory access to an address space of the transaction server to access control blocks of the transaction server and the internal trace that resides inside the address space of the transaction server;
  4. verifying that the address space of the transaction server is an active and eligible region of the transaction server;
  5. locating a current internal trace buffer;
  6. iteratively repeating the steps 3 to 5 until all regions of the transaction server have been read; and
  7. reading trace entries of the internal trace for each of the regions of the transaction server.

15. A method according to claim 14 wherein the step of locating the regions of the transaction server comprises locating the regions of the transaction server via their job name at a corresponding logical partition by following an address space control block ASID/ASCB chain using a standard technique for locating multiple virtual storage address spaces.

16. A method according to claim 14 wherein the steps of verifying that the address space of the transaction server is an active and eligible region of the transaction server comprises the steps of verifying that:
  1. a TCB field TCBCAUF points to a valid Authorized Function Control Block of the transaction server;
  2. a CSA field CSAXST indicates a region of the transaction server that is executing;
  3. a CSA field CSACIREL indicates that a version of the transaction server is 4.2 (670) or higher to ensure that the internal trace is written in 64-bit storage;
  4. the CSA indicates that a System Master Trace is on CSATRSYS=1;
  5. a DFHTRA Trace Anchor Block indicates that the internal trace is started TRA_MASTER=1; and
  6. domain tables of the transaction server anchored off a domain table header DFHKEDO of the transaction server indicate a minimum level of trace categories of the transaction server being active.

17. A method according to claim 14 wherein locating the current internal trace buffer comprises (1) using a DFHTRA Trace Anchor Block for locating the internal trace in 64 bit storage and (2) working back from a position in the (4K) buffer where a field TRA-NAB points, a previous buffer being the current internal trace buffer, which is a starting point for monitoring and reading the trace entries of the internal trace.

18. A method according to claim 14 further comprising examination of the current internal trace buffer to determine whether the internal trace is deemed to have wrapped because of a TREN_TIME timestamp of a first trace entry has changed and if the TREN_TIME timestamp has changed shutting down monitoring.

19. A method according to claim 14 further comprising examining a next internal trace buffer that immediately follows the current internal trace buffer examined to determine whether the current internal trace buffer is full by the transaction server having written at least one new trace entry to the next internal trace buffer.

20. A method according to claim 14 further comprising the step of comparing TREN_TIME timestamps of the first trace entry in the current and next internal trace buffers and if the TREN_TIME timestamp of the first entry of the next internal trace buffer is greater than the TREN_TIME timestamp of the first entry in the current internal trace buffer then the current internal trace buffer is deemed to be full and ready.

21. A method according to claim 14 further comprising the step of passing of the current internal trace buffer to a computing module when monitoring of the current internal trace buffer has deemed it to be ready.

22. A method according to claim 14 further comprising the step of processing next internal trace buffers until a maximum number of buffers have been processed, wherein the step of the processing of the next internal trace buffers comprises comparing TREN_TIME timestamps of a first trace entry in the current internal trace buffer and a next internal trace buffer and if the TREN_TIME timestamp of the next internal trace buffer is greater than the TREN_TIME timestamp of the current internal trace buffer then the current internal trace buffer is deemed to be full and ready.

23. A method according to claim 22 further comprising optimizing the maximum number of buffers to ensure that a first computing module for reading the internal trace has a greatest chance of keeping up with the transaction server writing new trace entries.

24. A method according to claim 14 further comprising suspending monitoring of the region of the transaction server when the current internal trace buffer is not ready for monitoring or the maximum number of trace buffers has been processed.

25. A method according to claim 14 further comprising the step of suspending monitoring for a particular period of time to ensure that a monitoring process to monitor transaction processing of the transaction server does not use excessive amounts of CPU resources.

26. A method according to claim 14 further comprising the step of suspending a monitoring process by an external command, wherein the monitoring process monitors transaction processing of the transaction server.

27. A method according to claim 14 further comprising the step of recording the internal trace in a second computing module when the current internal trace buffer is passed to a first computing module when monitoring of the current internal trace buffer has deemed it to be ready.

28. A method according to claim 14 wherein the reading of the trace entries occurs close to a time that the trace entries are being written into the internal trace by the transaction server.

29. A method for reconstructing an application lifecycle view of transactions processed by a transaction server having first storage devices to store trace entries generated during transaction processing, the method comprises the steps of:
  1. reading via a first computing module, trace entries generated by the transaction server during processing of a transaction and written to an internal trace of the transaction server;
  2. passing the trace entries to a second computing module;
  3. reconstructing via the second computing module, the application lifecycle of the transaction processed by the server using the trace entries read by the first computing module;
  4. passing the reconstructed application lifecycle to a third computing module; and
  5. writing via the third computing module, the reconstructed application lifecycle to second storage devices; and
  wherein the step of reading the trace entries comprises the steps of:
  6. locating regions of the transaction server on a logical partition;
  7. establishing a recovery environment to detect and recover from abnormal endings that occur if a region of the transaction server suddenly becomes unavailable;
  8. establishing access register mode cross-memory access to address space of the transaction server to access control blocks of the transaction server and the internal trace that resides inside the address space of the transaction server;
  9. verifying that the address space of the transaction server is an active and eligible region of the transaction server;
  10. locating a current internal trace buffer;
  11. iteratively repeating the steps 8 to 10 until all regions of the transaction server have been read; and
  12. reading the trace entries of the internal trace for each of the regions of the transaction server.

30. A method according to claim 29 wherein the trace entries are generated when either (1) the transaction server or an application program performs a function generating an application or system event or (2) the transaction server detects an exception condition.

31. A method according claim 29 wherein the reading of the trace entries occurs close to a time that the trace entries are being written into the internal trace by the transaction server to minimize a chance of data loss due to a wrap-around nature of the internal trace.

32. A method according to claim 29 wherein the step of reconstructing the application lifecycle of the transaction comprises the steps of:
  1. sequentially extracting TREN trace entries from a 4K internal trace buffer of the transaction server;
  2. deciding whether the analyser is to either (1) consolidate multi-region operations into a single transaction or (2) treat each of the regions of the transaction server separately;
  3. either (1) merging the trace entries from each of the regions of the transaction server in ascending chronological sequence for all CICS multi-region operations of the transaction server and the chronological merge of trace entries proceeds to cache if the second computing module is to consolidate multi-region operations or (2) processing the trace entries one at a time if the second computing module is to treat each of the regions of the transaction server separately;
  4. deciding whether a particular trace entry belongs (1) to a transaction that is currently being reconstructed or (2) to a new transaction;
  5. if the particular trace entry belongs to the transaction that is currently being reconstructed then the trace entry is added to the transaction that is currently being reconstructed;
  else
  6. if the particular trace entry belongs to a new transaction the new transaction is registered.

33. A method according to claim 32 further comprising the step of passing the TREN trace entry to the second computing module for processing.

34. A method according to claim 32 further comprising loading a timestamp and a virtual storage address of each of the trace entries into storage devices for future processing.

35. A method according to claim 32 further comprising correlating individual tasks of the transaction server that make up a multi-region operation transaction using a network unit-of-work ID of the transaction server.

36. A method according to claim 32 further comprising extracting a unit-of-work ID from either an RM 0209 or an RM FA01.

37. A method according to claim 32 wherein every network unit-of work id is registered in a look-up table in order that each task of the transaction server with a same network unit-of-work Id is treated as a single logical transaction.

38. A method according to claim 32 further comprising trace entries that are associated to their transactions using a task number TREN_TASK of the transaction server.

39. A method according to claim 32 further comprising registering any new transaction upon receipt of an XM 1102 trace event that signifies an attachment of a new transaction.

40. A method according to claim 32 further comprising transferring a complete reconstructed transaction to a third computing module.

41. A method according to claim 32 further comprising writing a transaction detail that has been reconstructed by the second computing module to direct-access storage device data sets for visualization by a user.

42. A method according to claim 32 wherein writing the reconstructed application lifecycle to the second storage devices comprises the steps of:
  1. writing reconstructed transaction data to an active detail data set of the second storage devices;
  2. updating a transaction summary record with a reference to a detail data set and a pointer to a position in the detail data set established in a previous step;
  3. buffering transaction summary information into a summary buffer; and 4. when the summary buffer is full, or a small amount of time has expired then the summary buffer is written to a summary archive data set, else
5. when the summary archive data set or a detail archive data set becomes full then a new archive data set is allocated and registered into a checkpoint data set, along with a timestamp of a first record in the archive data set.

43. A method for taking a snapshot of an entire internal trace of one or more transaction server regions at a particular moment of time; the method comprises the steps of:
   1. locating regions of the transaction server on a logical partition by following an address space control block ASID/ASCB chain using a standard technique for locating multiple virtual storage address spaces;
   2. establishing a recovery environment to detect and recover from abnormal endings that occur if a region of the transaction server suddenly becomes unavailable due to being shut down;
   3. establishing AR-mode cross-memory access to an address space of the transaction server to access control blocks of the transaction server and the internal trace that reside inside the address space of the transaction server;
   4. verifying that the address space of the transaction server is an active and eligible region of the transaction server;
   5. locating an oldest internal trace buffer which immediately follows an active internal trace buffer to establish a starting point of the snapshot;
   6. writing the trace entries stored in a current internal trace buffer to an auxiliary trace data set;
   7. positioning of the current internal trace buffer to a next trace buffer; and
   8. iteratively repeating the steps 6 to 7 until positioning is back to an original starting point and one circuit of the internal trace has been completed meaning that a snapshot process is complete and the auxiliary trace data set is closed and available for use.

44. A method according to claim 43 wherein the step of verifying that the address space of the transaction server is an active and eligible region of the transaction server comprises the steps of verifying that:
   1. a TCB field TCBCAUF points to a valid Authorized Function Control Block AFCB of the transaction server;
   2. a CSA field CSAXST indicates a region of the transaction server that is executing;
   3. a CSA field CSACIREL indicates a version of the transaction server is 4.2 (670) or higher to ensure that the internal trace is written in 64-bit storage;
   4. a CSA indicates that the System Master Trace is on CSATRSYS=1;
   5. a DFHTRA Trace Anchor Block indicates that the internal trace is started TRA_MASTER=1; and
   6. domain tables of the transaction server anchored off a domain table header of the transaction server DFHKEDOH indicate a minimum level of trace categories of the transaction server being active.

45. A method for obtaining information about at least one of a particular application and system events, and exception conditions generated during processing of a computer program or a transaction and stored in an internal trace of the transaction server in a form of trace entries, the method comprises the steps of:
   1. reading the internal trace of the transaction server to obtain the trace entries;
   2. storing the trace entries in storage devices; and
   3. reading the storage devices to obtain information about the at least one of the particular application and the system events, and the exception conditions generated during processing of a computer program or a transaction:, wherein the step of reading the internal trace of the transaction server to obtain the trace entries comprises the steps of:
   4. locating regions of the transaction server on a logical partition;
   5. establishing a recovery environment to detect and recover from abnormal endings that occur if a region of the transaction server suddenly becomes unavailable;
   6. establishing access register mode cross-memory access to an address space of the transaction server to access control blocks of the transaction server and the internal trace that reside inside the address space of the transaction server;
   7. verifying that the address space of the transaction server is an active and eligible region of the transaction server;
   8. locating a current internal trace buffer; and
   9. reading the trace entries of the internal trace for each of the regions of the transaction server.

46. A method according to claim 45 wherein the storage devices comprise at least one auxiliary trace data set.

47. A method according to claim 45 wherein the step of reading the internal trace of the transaction server to obtain the trace entries comprises taking a snapshot of the entire internal trace by performing the following steps:
   1. locating CICS regions on the logical partition by following an address space control block ASID/ASCB chain using a standard technique for locating multiple virtual storage address spaces;
   2. establishing a recovery environment to detect and recover from abnormal endings that occur if a region of the transaction server suddenly becomes unavailable due to being shut down;
   3. establishing access register mode cross-memory access to the address space of the transaction server to access the control blocks of the transaction server and the internal trace that reside inside the address space of the transaction server;
   4. verifying that the address space of the transaction server is an active and eligible region of the transaction server;
   5. locating an oldest internal trace buffer which immediately follows an active internal trace buffer to establish a starting point of the snapshot;
   6. writing the trace entries stored in the current internal trace buffer to an auxiliary trace data set;
   7. positioning of the current internal trace buffer to a next internal trace buffer; and
   8. iteratively repeating the steps 6 to 7 until positioning is back to an original starting point and one circuit of the internal trace has been completed meaning that a snapshot process is complete and the auxiliary trace data set is closed and available for use.

\* \* \* \* \*